June 9, 1959
R. L. BROWN
2,889,600
FASTENER
Filed Dec. 22, 1955
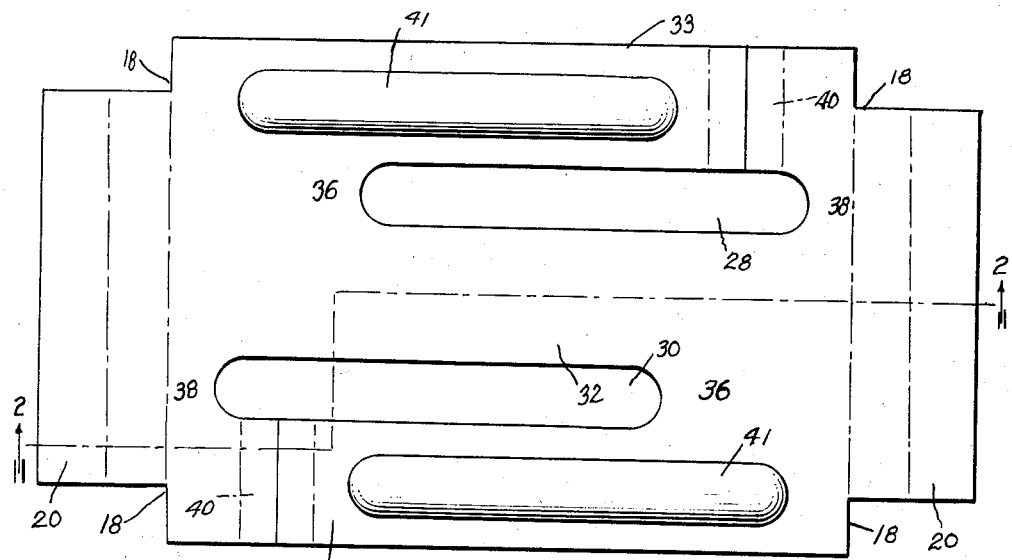
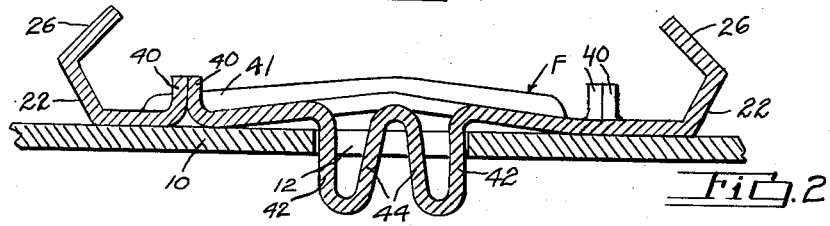
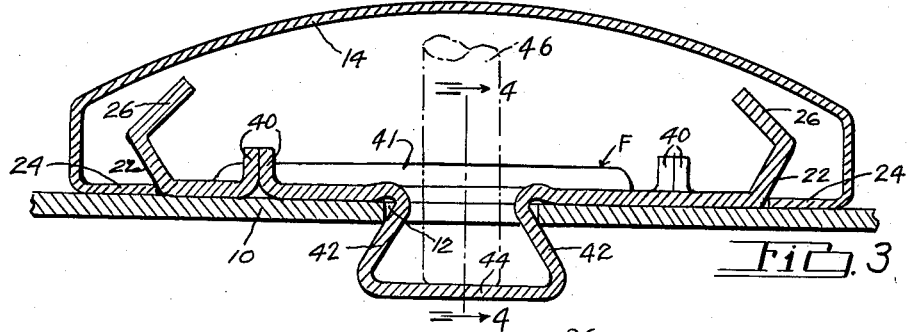
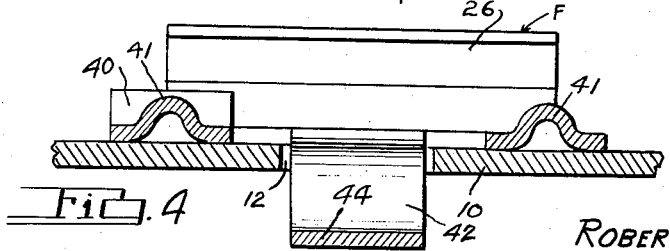
INVENTOR.
ROBERT L. BROWN
BY
ATTORNEY

United States Patent Office 2,889,600
Patented June 9, 1959

2,889,600

FASTENER

Robert L. Brown, Ferndale, Mich.

Application December 22, 1955, Serial No. 554,737

2 Claims. (Cl. 24—73)

This invention relates to a fastener of the type adapted to be secured to a supporting panel to which is applied a decorative or accessory attachment. The invention has been illustrated as a means for securing ornamental beading or so-called trim molding to automobile bodies in a rapid but secure and inexpensive manner suited to large scale production. It will be apparent, however, that the principles of the invention are readily applicable to other uses.

An object of the invention is to provide an improved securing fastener of the indicated character which may be quickly and easily attached and which provides a secure fastener.

Another object of the invention is to provide such a fastener having a deformable portion which may be readily inserted through an aperture in a supporting panel and firmly secured to the supporting panel by deformation of the inserted portion into locking position, the deformable portion being provided with means for spreading holding portions which lock the fastener to the support and which means serves as a bridge or toggle to retain the holding portions in locked position.

Other objects and advantages of such a fastener will be more apparent from the following description taken in connection with the accompanying drawings, in which:

Fig. 1 is a top plan view of a sheet metal blank from which the improved fastener is formed;

Fig. 2 is a cross sectional view of the fastener, taken on line 2—2 of Fig. 1 after it has been formed, inserted into the opening in the supporting panel, before the fastener is locked to the panel;

Fig. 3 is a view corresponding to Fig. 2, but showing the fastener pressed or deformed into locking position with the supporting panel; and Fig. 4 is a cross sectional view taken on line 4—4 of Fig. 3.

Referring now to the drawings, reference numeral 10 designates a supporting panel provided with an aperture 12 therethrough for receiving the fastener which secures a molding 14 to the outer face of the panel.

The fastener, designated by the letter F, is formed from flat sheet metal and is blanked out to the form shown in Fig. 1. The blank is then folded and formed to the shape shown in Fig. 2. The blank is of general rectangular shape with its four corners notched out, as at 18, to provide outwardly extending flanges 20 at the opposite ends thereof. These two flanges 20 are divergent to the body of the blank, first upwardly and outwardly and then upwardly and inwardly, forming a V, to provide tapered surfaces 22 for inwardly extending flanges 24 on the molding 14. The surfaces 26 form a guide for the flanges 24 when the molding is sprung or snapped over the V into holding position.

The body portion of the blank is provided with two parallel cut out portions 28 and 30 which are spaced apart defining a central bridge portion 32 and a pair of outer longitudinal edge portions 33 and 34. The cut out portions 28 and 30 are arranged longitudinally in the blank at different longitudinal positions, so that the integral connecting portion 36 between one edge portion 33 and the bridge 32, at one end of the blank, is of greater length than the length of the connecting portion 38 between the bridge 32 and the opposite edge portion 34. The connecting portions 36 and 38 are reversed at the opposite end of the blank.

The edge portions 33 and 34 are each severed close to the shorter connecting portions 38, and the adjacent ends, at the line of severance, are bent upwardly at right angles to the plane of the blank into flanges 40. The edge portions 33 and 34 are each provided with upwardly pressed stiffening ribs 41. Up to this point each edge portion 33 and 34 is divided and each section is spaced apart a distance equal to the length of two upturned flanges 40.

The next operation is to form by pressing the bridge 32 at its central portion into the form of the letter W, with the outer legs 42 of the W depending from the blank substantially in parallel relation, and the intermediate legs 44 of the W converging upwardly and joined together in the plane of the blank. The body of the blank, at its center, is depressed slightly upwardly so that its opposite end portions rest on the supporting panel 10 with the central portion slightly spaced from the panel 10, to be later drawn down when the fastener is applied and locked to the panel. Formation of the W in the blank causes the spaced flanges 40 to approach and abut each other, drawing the opposite end portions of the blank inwardly.

The fastener in its completed form appears as the disclosure in Fig. 2 and is ready to be applied to the panel. This is easily done by inserting the depending W portion through the aperture 12 in the supporting panel 10 with the opposite ends and edge portions resting on the upper surface of the panel. A suitable tool, preferably in the form of a punch 46, shown in dot and dash lines, Fig. 3, is placed on the apex of the W portions 44 and a downward pressure is applied thereto. This action causes the intermediate legs to assume a horizontal position forcing the once parallel outer legs 42 to be forced outwardly in divergent relation over the lower edge of the aperture 12 in the panel 10, drawing the central portion tightly down on the upper face of the panel to prevent any twisting or turning of the fastener. The intermediate legs 44, now being in horizontal alignment act as a bridge between the outer lower ends of the outwardly bent legs 42 to retain them in that position against returning to their originally formed position, thereby forming a rigid retainer lock for holding the fastener in locked position with the panel.

While it will be apparent that the preferred embodiments of the invention herein disclosed are well calculated to fulfill the objects above stated, it will be apparent that the invention is susceptible of modification, variation and change without departing from the proper scope or fair meaning of the appended claims.

I claim:

1. A sheet metal fastener comprising, a body portion of generally rectangular formation having V-shaped upwardly extending flanges at its opposite ends adapted to engage a molding, said body portion having transversely spaced and longitudinally extending cut out portions defining longitudinally extending edge portions at the sides of said body portion located outwardly of said cut out portions, and a bridge portion connecting opposite ends of said body portion, each of said edge portions being severed transversely and adjacent, upwardly turned flanges at ends of the severed portions, and a depending bendable W-shaped formation in a central portion of said bridge portion adapted to be inserted in an aperture in a panel, whereby upon insertion of said bendable W-shaped formation in the aperture and bending thereof the fastener will attach a molding engaging said flanges to the panel.

2. A sheet metal fastener comprising, a body portion of generally rectangular formation, said body having means adapted to engage a molding at its ends, and having transversely spaced and longitudinally extending cut out portions defining longitudinally extending edge portions at sides of said body portion, and a bridge portion connecting opposite ends of said body portion, each of said edge portions being severed transversely, and upwardly turned flanges at ends of the severed portions, and a depending bendable W-shaped formation in a central portion of said bridge portion, adapted to be inserted in an aperture in a panel whereby upon insertion of said bendable W-shaped formation in the aperture and bending thereof the fastener will attach a molding which engages said means to the panel.

References Cited in the file of this patent
UNITED STATES PATENTS

| | | |
|---|---|---|
| 2,670,512 | Flora | Mar. 2, 1954 |
| 2,681,487 | Poupitch | June 22, 1954 |
| 2,746,111 | Chvosta | May 22, 1956 |